April 28, 1964  D. R. D'ARNAUD GERKENS  3,131,063
METHOD OF PRODUCING A CRISPY EXPANDED FORMED FOODSTUFF
Filed Aug. 17, 1960  2 Sheets-Sheet 1

INVENTOR
DIRK R. D'ARNAUD GERKENS
BY
ATTORNEYS

April 28, 1964  D. R. D'ARNAUD GERKENS  3,131,063
METHOD OF PRODUCING A CRISPY EXPANDED FORMED FOODSTUFF
Filed Aug. 17, 1960  2 Sheets-Sheet 2

INVENTOR
DIRK R. D'ARNAUD GERKENS
BY
ATTORNEYS

United States Patent Office 3,131,063
Patented Apr. 28, 1964

3,131,063
METHOD OF PRODUCING A CRISPY EXPANDED FORMED FOODSTUFF
Dirk R. d'Arnaud Gerkens, Breda, Netherlands, assignor to Nibbit Products Association Ltd., Zurich, Switzerland, a corporation of Switzerland
Filed Aug. 17, 1960, Ser. No. 50,271
9 Claims. (Cl. 99—1)

This invention relates to a method of controlling the fat content and the degree of expansion of crispy fried foodstuffs of the type described in United States Patent No. 2,863,770.

In said patent a method of producing a crispy fried foodstuff is described which comprises extruding a pre-swelled potato flour containing between 30% and 40% of water into strands, drying the strands to a moisture content of between 6% and 10%, breaking or cutting into piecelets and frying the piecelets in hot fat. On frying the pieces expand to about five-fold their volume before frying to produce a crispy fried foodstuff used as a snack food.

The fat content of the fried pieces produced in this way is quite variable, usually in excess of 20%, and no way has heretofore been known for controlling the percentage of fat content of the fried pieces.

The control of the percentage of fat content of the fried pieces is, however, of great importance as the fat content has a great influence on the taste. If the percentage of fat content is low, the taste of the product is produced mainly by the taste of the potato or other flour or starch raw material used or by the other seasoning used, whereas if the fat content is high, the taste of the fat will determine the initial taste of the product and give it a predominantly fatty taste. Also, some people, especially in summer or in hot climates, do not like fatty tastes and with diet conscious people the high calorie content of the fat becomes objectionable. On the other hand, a high fat content may be preferred in winter or in a cold climate.

I have discovered that it is possible to control the fat content of the final fried foodstuff by controlling the moisture content of the dried pieces (sometimes called "half" material) at the time of frying, and that contrary to all expectations the half material containing the lowest moisture content produces a fried product with the lowest fat content. I have also discovered that the moisture content of the skin or surface of the fry ready half material relative to the moisture content on the interior of the fry ready pieces has an important influence on the volume of expansion of the dried pieces during frying, the fry ready or half material having in the surface layers a moisture content of not more than 85% of the average moisture content of the half material, providing the greater volume expansion of the foodstuff on frying.

I have also discovered that some of the variability in results encountered on frying the half material is due to the fact that when the dried half material is exposed to a moist atmosphere exceeding 55% relative humidity, it rapidly absorbs moisture and changes in its fat absorption and swelling characteristics during frying.

One of the objects of my invention is, therefore, to provide a method of controlling the fat content of a crispy expanded fried foodstuff by controlling the moisture content at the time of frying.

Another object of my invention is to provide a method of controlling the volume expansion of a crispy, expanded fried foodstuff by controlling the relative moisture content between the outside and the interior of the dried "half" material at the time of frying.

Another object of my invention is to provide a fat fried, crispy foodstuff, derived from starch containing flour, preferably potato flour, having a low specific gravity, less than .20 as the quotient of weight to volume and having a controlled fat content preferably of less than 19%.

Another object of the invention is to minimize the variable results heretofore obtained on frying the dried half material by insuring that at the time of frying, the half material has the desired total moisture content and the desired lower moisture content on the skin or surface thereof by preventing the half material from absorbing moisture from the air just prior to frying.

Various other objects and advantages of my invention will appear as this description proceeds.

Referring now to the drawings—

Figure 1:
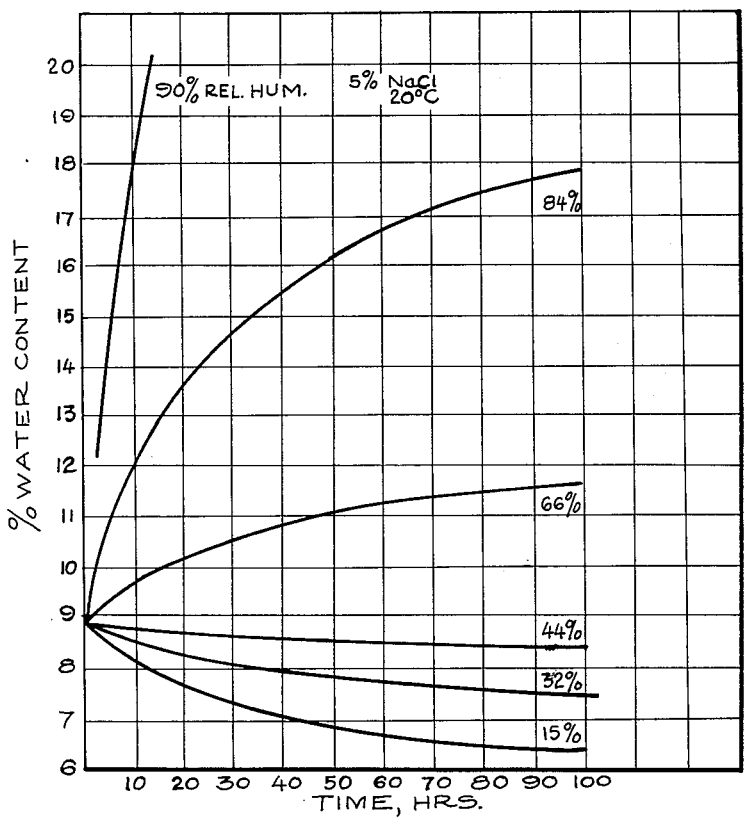
FIG. 1 illustrates the humidity relationship of the strands of half material having 5% NaCl content, after extrusion and drying to an average and overall moisture content of about 9%, when subjected to storage for different periods of time in atmospheres of different relative humidity.

Whereas potato chips contain on the order of 40% fat content and prior fried crispy expanded potato flour foodstuffs contain in excess of 25% of fat, I am able by the procedures herein described to produce a palatable, crispy expanded foodstuff from potato flour and similar starch containing materials which has a weight-to-volume ratio of less than .20 and a fat content of less than 20%, preferably less than 18%. As the fat content has an important influence on the cost and taste of these products, as well as their sales appeal, this represents an important advance in the field of manufacture of crispy, expanded fried foodstuffs produced from potato flour and similar starch powders.

In preparing my improved foodstuff, the intermediate, "fry ready" or half material is preferably produced from a powdery mixture of starch-containing ground potato flour and water in which the desired amount of salt is dissolved. The moisture content of the ground potato flour is preferably about 10% to 11% and water is added so that the mixed flour powder as fed to the extrusion machine contains between 30% and 40% of water, is moist to the touch, and of such consistency that with low pressure, such as squeezing in the hand, it will not permanently retain the form in which it has been pressed, but after a short while will lose its coherence.

During the extrusion under high pressure of at least 6 atmospheres and the increase in temperature produced by the extrusion, as described in United States Patent No. 2,863,770, it is believed that the starch containing cells in the outer layers of the strands liberate their starch, providing a layer of free starch on the outer surface of the extruded strands. While it is possible to prepare such a material having a greater free starch content on the outside by making several batches of dough, each having a different free starch content, and forming layers, this is difficult and time consuming.

I have found that an intermediate or fry ready product prepared from starch-containing flour and having a graduated free starch content from the center to the outside is readily and simply prepared by the process of extruding the ground potato flour, containing preferably from 30% to 40% of total moisture and from 4% to 6% of added salt on fry ready material, under a pressure of at least 6 atmospheres, through a small opening and drying the same. The mechanical force required to extrude this powder through the small opening or openings is sufficient to plasticize the flour, moistened as described above, and is believed to produce a certain amount of a breakdown of flour particles adjacent to the die surfaces of the extrusion press causing the starch within the particles to be liberated. At the moment of extrusion, the product is almost completely homogeneous with respect to moisture content, and before drying is in the form of rubbery strands, even though small lumps may have been present in the unextruded powder. This product as extruded contains from 30% to 40% moisture on a total weight basis and when slowly dried at room temperature and then subjected to further drying in an atmosphere of controlled moisture content of below 45% relative humidity for a sufficient length of time to dry the surface to a moisture content of below 9%, preferably below 7% while the interior remains above 14%, will form an intermediate or half material having a hard dry horny outer layer or shell enclosing an interior of higher moisture content so that upon frying, little fat will penetrate into the fried product and at the same time the product will expand to more than five times its volume before frying.

When, however, this half material is subjected to storage or shipment under conditions of higher relative humidity, for example, above about 50%, it quickly absorbs moisture on the outer or skin layer thereof, which weakens the outer layer or shell so that the desirable frying characteristics of the half material are destroyed and the fried product produced therefrom contains a relatively high fat content, for example, above 23%, whereas a fat content of below 23%, preferably 18% to 19%, is desired.

FIG. 1 illustrates the change in moisture content of the half material when stored in or subjected to atmospheres of 15%, 32%, 44%, 66%, 84% and 90% relative humidity, in terms of gain or loss in moisture content on hours of storage. Below a relative humidity of about 45% there is a slight loss in moisture content, but above 50% the gain in moisture content, mainly on the surface or outer layer of the dried half material, is very rapid. Thus in an atmosphere having a relative humidity of 66%, which is quite common in temperate climates, a dried half material containing an average moisture content of 9% at the end of the drying will gain 1% of moisture in 20 hours and 2% in 50 hours, the gain being largely in the surface layers thereof. At 84% relative humidity the gain in moisture content is nearly four times the gain at 66% relative humidity and at high relative humidities the gain in moisture content is even more rapid. As the moisture thus absorbed is mainly in the horny outer layer of the dried half material, the result is that this layer is softened and penetrated with the absorbed moisture, permitting rapid disruption of this layer when the half material is immersed in the hot fat, which weakens this horny outer layer, permits greater penetration of fat into the interior of the fried pieces before expansion thereof and reduces the expansion, or volume-to-weight ratio, producing a low volume, high fat content material which is less digestible, has a high fat taste and a high calorie content per unit of volume, all of which is undesirable. It is believed that the variability in frying characteristics heretofore found in the dried half material is due largely to exposure to humid atmospheres so that the half material at the time of frying did not contain the right percentage of moisture on the inside and on the surface thereof.

Figure 2:
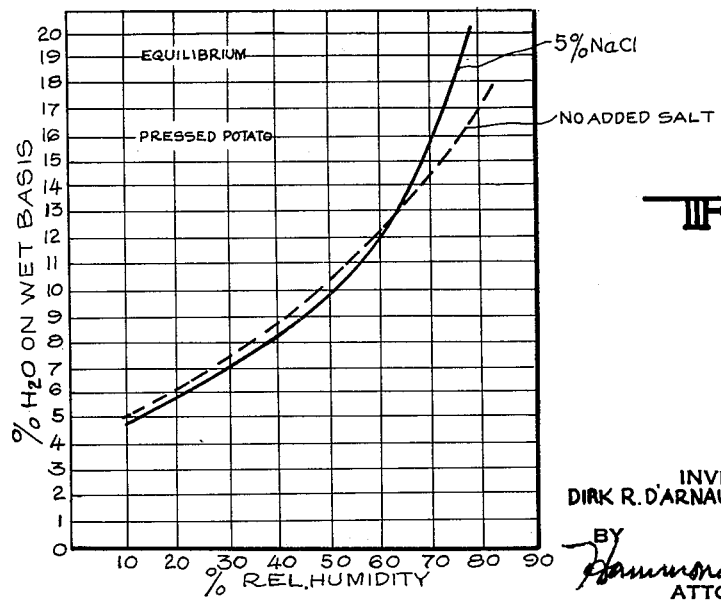
FIG. 2 illustrates the humidity or moisture content of dried strands of the half material of 5% and 0% NaCl content after storage under different conditions of atmospheric humidity.

FIG. 2 illustrates the equilibrium conditions of the dried half material after storage for prolonged periods in atmospheres of different relative humidity. The solid line represents equilibrium conditions for a dried half material having a 5% NaCl content while the dotted line represents equilibrium conditions for a dried half material containing no added NaCl. Up to a relative humidity of about 60% the lines run parallel. However, over a relative humidity of 60%, the salt-containing dried material absorbs water much more rapidly. Since the half material is frequently exposed to humidities higher than 55% during storage or shipping, it often reaches a humidity equilibrium above that which produces good frying conditions, namely, a dry horn-like outer layer preferably containing a moisture content of not more than 85% of the average overall moisture content of the total product and having a moisture content increasing from 4% to 8% on the horn-like exterior to about 8% to 18% at the center of the strands.

Figure 3:
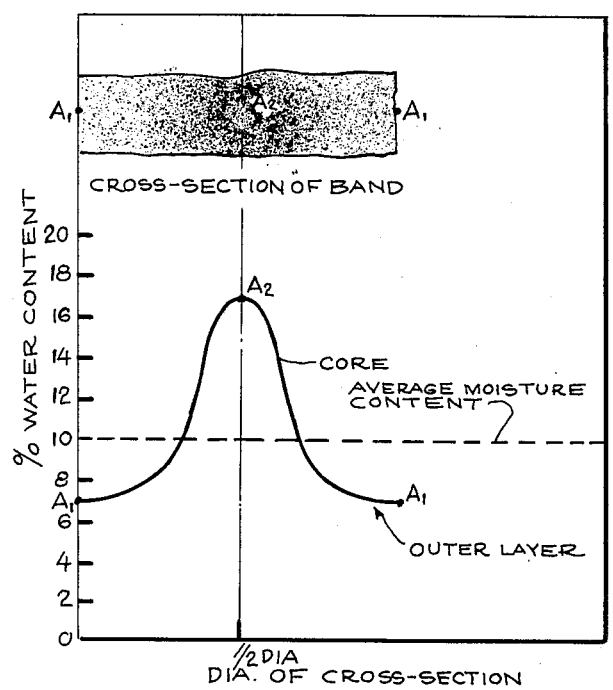
FIG. 3 illustrates the humidity difference between the skin and the interior of a fry ready strand under conditions most favorable for the production of a highly expanded low fat content fried crispy foodstuff.

FIG. 3 illustrates one example of the desired humidity difference or gradation of moisture content from the exterior to the interior of a strand or piecelet of the dried half material when ready for frying, in which the line A indicates the difference of moisture content between the outer layer and the center of a dried fry ready half material. As illustrated in this particular figure, the dried strand has a moisture content of approximately 7% at the outer edges $A^1$ of the dried strands or piecelets while at the center or ½ diameter $A^2$ of the strands the moisture content is approximately 17%. When such strands or piecelets are fried in hot fat, the relatively dry horny outer layer has a higher boiling point than the more moist interior and is tougher and more resistant to fat penetration. It, therefore, prevents penetration of the fat into the interior while at the same time confining the moist interior inside the dry horny outer layer until the temperature of the interior has been raised above the boiling point of water, under the concentration and pressure conditions prevailing in said interior, at which time the pressure from the inside suddenly blows the entire strands or piecelets up, expanding them to a volume-to-weight ratio such that they rise to the surface of the hot fat in which they are being fried and can be removed from the frying vessel, and drained of the excess fat, to provide an expanded, crispy, fried foodstuff having a weight-to-volume ratio of less than 0.20 and a fat content of less than 20%.

The following table illustrates the change in moisture content of the dried half material of different NaCl content and substantially the same initial $H_2O$ content when subjected to different relative humidities for various periods of time.

TABLE I

|  | Percent of relative humidity | | | | | |
|---|---|---|---|---|---|---|
|  | 15 | 32 | 44 | 66 | 84 | 90 |
| 0% NaCl (Initial $H_2O$, 10.65%): Percent $H_2O$ after— | | | | | | |
| 24 hrs | 8.2 | 8.93 | 9.75 | 11.3 | 14.15 | 17.85 |
| 48 hrs | 7.52 | 8.5 | 9.4 | 11.35 | 15.15 | 19.1 |
| 93 hrs | 6.9 | 8.4 | 9.35 | 11.8 | 15.7 | 19.9 |
| 1% NaCl (Initial $H_2O$, 10.8%): Percent $H_2O$ after— | | | | | | |
| 44 hrs | 8.3 | 9.25 | 10.25 | 11.8 | 15.9 | |
| 69 hrs | 7.95 | 8.95 | 9.95 | 12.1 | 16.25 | |
| 2% NaCl (Initial $H_2O$, 10.75%): Percent $H_2O$ after— | | | | | | |
| 19 hrs | 8.75 | 8.9 | 9.8 | 11.3 | 14.75 | |
| 70 hrs | 7.65 | 8.4 | 9.5 | 11.9 | 16.4 | |
| 97 hrs | 7.0 | 8.2 | 9.2 | 12.0 | 16.6 | |
| 4% NaCl (Initial $H_2O$, 10.5%): Percent $H_2O$ after— | | | | | | |
| 48 hrs | 7.25 | 8.2 | 9.5 | 11.0 | 17.8 | |
| 75 hrs | 6.9 | 7.8 | 9.15 | 11.5 | 18.7 | |
| 95 hrs | 6.65 | 7.75 | 9.55 | 11.9 | 19.5 | |

TABLE I—Continued

| | Percent of relative humidity | | | | | |
|---|---|---|---|---|---|---|
| | 15 | 32 | 44 | 66 | 84 | 90 |
| 5% NaCl (Initial H₂O, 10.25%), first series: Percent H₂O after— | | | | | | |
| 18 hrs | 8.85 | 9.5 | 9.9 | 11.4 | 15.65 | 22.7 |
| 42 hrs | 7.75 | 8.25 | 9.05 | 11.4 | 17.8 | 26.1 |
| 66 hrs | 7.95 | 8.9 | 9.7 | 12.7 | 20.4 | 28.6 |
| 5% NaCl (Initial H₂O, 8.83%), second series: Percent H₂O after— | | | | | | |
| 43 hrs | 7.05 | 8.0 | 8.65 | 11.2 | 16.0 | |
| 67 hrs | 6.6 | 7.6 | 8.55 | 11.2 | 16.15 | |
| 92 hrs | 6.3 | 7.45 | 8.4 | 11.5 | 18.0 | |
| 6% NaCl (Initial H₂O, 11.05%): Percent H₂O after— | | | | | | |
| 44 hrs | 8.35 | 9.05 | 10.1 | 12.6 | 19.75 | |
| 69 hrs | 7.9 | 9.8 | 10.1 | 12.95 | 21.2 | |
| 94 hrs | | 8.65 | 10.0 | 12.9 | | |
| 317 hrs | 6.05 | | | | 22.55 | |

The following table illustrates the fat content of fried half material of different moisture and NaCl content when fried at a fat temperature of 190° to 195° C. for a period of 15 seconds and immediately drained of the surpulus fat. Since the half material is not a definite chemical composition, slight deviations from strict mathmatical lines will be seen in the data in the table.

Figure 4:
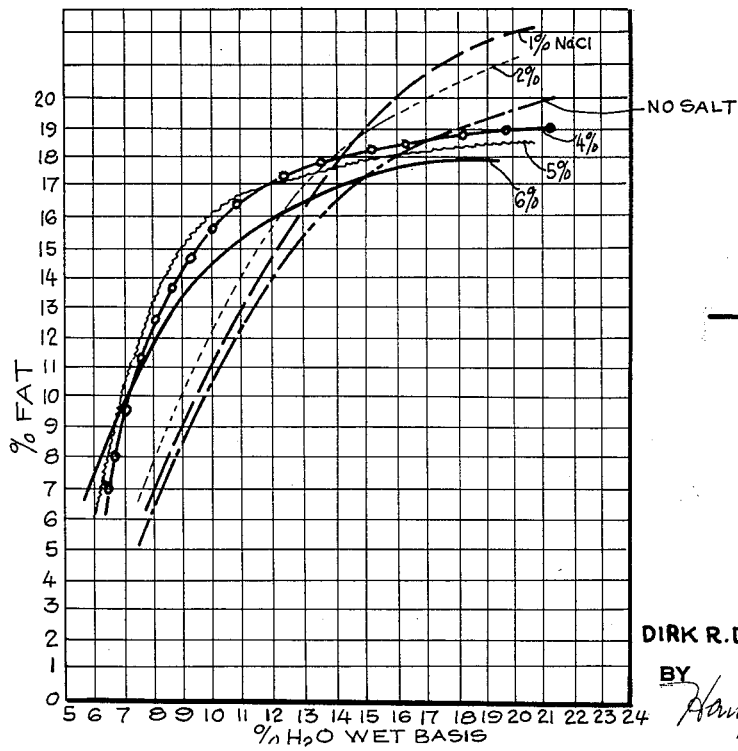
FIG. 4 illustrates the increase in fat content with increase in moisture content on frying of the dried half material.

As will be seen from Table II and FIG. 4, it is possible to control the fat content of crispy expanded fried food products of the type described between limits of 5% and 20% by controlling the moisture content of the dried half material at the time it is introduced into the hot fat. The NaCl content of the dried half material has some effect on the fat content of the fried material as is shown by the slight displacement of the curves on FIG. 4. For example, a half material of a low salt content, below 2%, and 10% total moisture content, and having the desired lower moisture content on the surface thereof can be fried to produce a product having less than 13% fat content, whereas a half material having 4% to 6% salt fried under the same conditions will have about 15% to 16% fat content.

This data in FIG. 4 is the result of measurements in the laboratory. In plant operation the fat content will be about 5% higher than in the laboratory results but the form of the curves is the same. For example, a dried half material containing 9% total moisture content and 5% NaCl content produces a product in the laboratory containing 15% fat and in the plant containing 20% fat, and a half material containing 7% total moisture content and 5% NaCl content produces in the laboratory a fried product having a fat content of below 11% and in the plant having a fat content of about 15%. The increase in fat content in plant operations is caused by problems in

TABLE II

| Runs | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| 0% NaCl: | | | | | | | | | | | | | | | | | | |
| Percent H₂O | 8.2 | 8.9 | 9.75 | 11.3 | 14.15 | 17.85 | 7.5 | 8.5 | 9.4 | 11.35 | 15.15 | 19.1 | 6.9 | 8.4 | 9.35 | 11.8 | 15.7 | 19.9 |
| Percent fat | 7.5 | 9.4 | 9.7 | 14.3 | 17.3 | 18.4 | 6.9 | 7.1 | 7.3 | 11.9 | 17.95 | 18.3 | 5.1 | 5.8 | 7.7 | 12.8 | 19.0 | 20.8 |

| Runs | 1 | 2 | 3 | 4 | 5 | 6 | 7 | 8 | 8 | 10 |
|---|---|---|---|---|---|---|---|---|---|---|
| 1% NaCl: | | | | | | | | | | |
| Percent H₂O | 8.3 | 9.25 | 10.25 | 11.8 | 15.9 | 7.95 | 8.95 | 9.95 | 12.1 | 16.25 |
| Percent fat | 4.6 | 9.25 | 9.25 | 14.4 | 19.2 | 5.4 | 9.75 | 11.05 | 13.8 | 20.3 |

| Runs | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 2% NaCl: | | | | | | | | | | | | | | | |
| Percent H₂O | 8.75 | 8.9 | 9.8 | 11.3 | 14.75 | 7.65 | 8.4 | 9.5 | 11.9 | 16.4 | 7.0 | 8.2 | 9.2 | 12.0 | 16.6 |
| Percent fat | 10.2 | 9.95 | 15.1 | 17.0 | 18.1 | 6.6 | 6.9 | 11.5 | 15.0 | 19.5 | 4.6 | 7.35 | 9.7 | 13.7 | 19.6 |

| Runs | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 4% NaCl: | | | | | | | | | | | | | | | |
| Percent H₂O | 7.25 | 8.2 | 9.5 | 11.0 | 17.8 | 6.9 | 7.8 | 9.15 | 11.5 | 18.7 | 6.65 | 7.75 | 9.55 | 11.9 | 19.5 |
| Percent fat | 8.25 | 12.45 | 16.3 | 14.1 | 16.7 | 7.5 | 12.1 | 18.1 | 14.8 | 19.7 | 9.6 | 14.2 | 18.5 | 18.4 | 22.0 |

| Runs | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 5% NaCl: | | | | | | | | | | | | | | | |
| Percent H₂O | 7.05 | 8.0 | 8.65 | 11.2 | 16.0 | 6.6 | 7.6 | 8.55 | 11.2 | 16.15 | 6.3 | 7.4 | 8.4 | 11.5 | 18.0 |
| Percent fat | 8.25 | 11.6 | 12.15 | 16.8 | 17.95 | 8.85 | 12.9 | 15.3 | 16.85 | 18.0 | 6.4 | 12.05 | 16.2 | 16.0 | 18.9 |

| Runs | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 6% NaCl: | | | | | | | | | | | | | | |
| Percent H₂O | 8.25 | 9.05 | 10.1 | 12.6 | 19.75 | 7.9 | 8.8 | 10.1 | 18.95 | 21.2 | 6.1 | 8.65 | 10.0 | 12.9 |
| Percent fat | 12.3 | 13.85 | 15.7 | 15.5 | 18.4 | 12.0 | 14.6 | 14.1 | 17.2 | 19.9 | 6.8 | 12.4 | 13.8 | 15.4 |

It will be noted that in order to obtain a fat content of below 16% under the conditions described, it is necessary to have a half material at the start of the frying with total moisture content of below 12% and in order to secure proper expansion of the foodstuff on frying, the outer layer of the "fry ready" material should have a moisture content of not more than 85% of the average overall moisture content of the half material.

FIG. 4 illustrates graphically the increase in fat content of the fried product with increase in moisture content of the dried half material as shown by Table II.

handling large amounts of material from which it takes longer to drain the fat and therefore there is more cooling of the product and absorption of the fat into the pores of the product.

EXAMPLE 1

A dried potato flour prepared so that it has approximately 30% free starch content is added to water containing sodium chloride in such a ratio that the water content is between 28% and 35% and the salt content is between 4% and 6%, preferably 4.2% to 4.6% of the weight of the product to be fried. The dried potato flour may be prepared by blanching potatoes to a negative peroxydase test, drying and grinding to give a flour which passes through a 40 mesh sieve with at least 70% passing through a 50 mesh sieve and at least 50% passing through a 70 mesh sieve. The grinding releases some of the starch as free starch and when the proper grind is made as indicated, about 30% of the starch is believed to be in the free state capable of being dissolved in cold water. The mixture of water, salt and potato flour is kneaded in a mixer to obtain as uniform a loose powdery mass as is possible. Presence of small lumps in the powdery mass can be countenanced but large lumps should be reduced as much as possible. The powdery mixture should have a moisture content such that when squeezed in the hand it will retain the shape it is given by the hand for a short while and will then lose its coherence. The powdery mixture is then fed into an extrusion press and is extruded through orifices at a speed of approximately one centimeter per second using orifices of 1 x 3.2 mm. The strands leaving the orifices are plastic and elastic and expand to a cross section of about 8 to 10 mm.$^2$. The strands in this condition are somewhat elastic, like rubber. When slightly stretched they will tend to return to their original length and they can be stretched to about 120% of their length before rupturing. These strands are dried at room temperature to reduce the moisture content as low as practical and are then stored in a moisture conditioning room maintained at a relative humidity below 45%, and the drying is continued until the moisture content is reduced to an average of about 9% total moisture with the outer layer of the dried strand having a moisture content of about 7% and the center of the dried strands having a moisture content of about 17%. The strands are then broken into pieces about 30 mm. in length, care being taken that there is no change in moisture content due to absorption of moisture from the atmosphere, and fried for about 15 seconds in fat at 190-195° C. The fried product has a weight-to-volume ratio of about 0.18 and a fat content of about 16%. If after storage or shipment the dry material has absorbed moisture from the air, it is again placed in a moisture conditioning room maintained at a relative humidity below 45% (preferably below 35%) until the moisture content of the outer layers is reduced to about 7% and the moisture content at the center is reduced to about 17%, and when these limits are reached it is fried as described above to produce a fried product having the same characteristics.

EXAMPLE II 21 kilograms of dried potato flour containing about 30% free starch and having a range of grain size as follows: all of the material minus 40 mesh, and at least 70% minus 50 mesh, and at least 50% minus 70 mesh, and a water content of about 9.1%, is thoroughly mixed with 6 kilograms of water containing 1.180 kilograms of pure sodium chloride (equal to about 5%). To the mass is added 0.21 kilogram of curry powder. The mass is thoroughly mixed into a loose moist powder and passed through an extrusion press having orifices of 3 x ½ mm. at a high presure producing strands having a breadth of about 5 mm. and a thickness of about 2 mm. and an average moisture content of about 27%. The strands are placed in trays in a room having a circulating air supply and dried for about 6 hours at room temperature. Thereafter they are stored in a moisture conditioning room maintained at a relative humidity below 45% (preferably below 35%), and the drying is continued until the dried strands contain about 8% total moisture with the center having about 15% and the outer layers about 6%. The strands are then broken into pieces about 20-33 mm. in length, care being taken that there is no absorption of moisture from the atmosphere, and fried in hot oil at a temperature of about 200° C. for 7 to 9 seconds. The resulting fried product has a yellow to golden color, a weight-to-volume ratio of about 0.18 and a fat content of about 20%. If after storage or shipment, the dry material has absorbed moisture from the air, it is placed in a moisture conditioning room maintained at a relative humidity below 45% (preferably below 35%) until the moisture content of the outer layers is reduced to about 6% and the moisture content at the center is reduced to about 15%, and when these limits are reached it is fried as described above to produce a fried product having the same characteristics.

As shown by Table II, the lower the moisture content of the dried strands, the lower the fat content of the fried product, and the lower the moisture content of the outer layers relative to the moisture content of the center of the strands, the higher the volume increase of the fried material.

Generally speaking, for a good, highly expanded crispy fried product, the moisture content of the outer horny layers should not be higher than 85% of the overall average moisture content of the product, while the center should have a higher percentage of moisture content than the overall average moisture content of the half material. The greater the difference in water content between the outer layer and the center, the better the final product. The overall average moisture content of the half material should be less than 20%, preferably less than 15%. For example, when the overall average moisture content of the dried half material is 9%, the center of the half material may have a moisture content of 17%, while the outer horny layer should have not more than about 7% moisture content. When the overall average moisture content is about 8%, the moisture content of the center of the half material may be about 15%, and the outer horny layer should have not more than about 6% moisture content.

Under these conditions it appears that the outer layer having less moisture combined in the horny starch outer layer has a more elevated boiling point which causes the horny drier outer layer to act as an enveloping film which keeps the fat from penetrating into the material and keeps the steam, generated from the higher moisture content of the inner layer, inside the horny outer layer, blowing this up until the inner steam pressure is sufficient to burst out of the blown up outer envelope which expands the volume of the fried product and prevents penetration of oil into the center thereof whereby a high volume, low weight and low fat product is produced.

Table III shows the effect of reducing the moisture content of the dried strands (having an initial moisture content, immediately after drying, of about 8.5% to 11% by storing in a moisture conditioning room maintained at 20° C. for various periods of time and at different humidities) on the density and fat content of the fried product. Since the half material is not a definite chemical composition, slight deviations from strict mathematical lines will be seen in the data in the table.

TABLE III

*Influence of Moisture-Content on Properties of Fried Product*

| Percent NaCl | Percent H$_2$O | Percent fat | Density | Moisture conditioning room, 20° C. | | Weight percent | |
|---|---|---|---|---|---|---|---|
| | | | | Time, hr. | Percent rel. moisture | Loss | Gain |
| 0 | 8.2 | 7.5 | 0.235 | 24 | 15 | 2.67 | |
| | 8.93 | 9.4 | .238 | | 32 | 1.89 | |
| | 9.75 | 9.7 | .237 | | 44 | 1.02 | |
| | 11.3 | 14.3 | .246 | | 66 | | 0.72 |
| | 14.15 | 17.3 | .249 | | 84 | | 3.91 |
| | 17.85 | 18.4 | .281 | | 90 | | 8.05 |
| 0 | 7.52 | 6.9 | 0.254 | 48 | 15 | 3.39 | |
| | 8.50 | 7.1 | .251 | | 32 | 2.35 | |
| | 9.40 | 7.3 | .259 | | 44 | 1.38 | |
| | 11.35 | 11.9 | .254 | | 66 | | 0.77 |
| | 15.15 | 17.95 | .269 | | 84 | | 5.03 |
| | 19.1 | 18.3 | .294 | | 90 | | 9.42 |

TABLE III—Continued

| Percent NaCl | Percent H₂O | Percent fat | Density | Time, hr. | Percent rel. moisture | Loss | Gain |
|---|---|---|---|---|---|---|---|
| 0 | 6.9 | 5.10 | | 93 | 15 | 4.0 | |
|   | 8.4 | 5.8 | | | 32 | 2.43 | |
|   | 9.35 | 7.7 | | | 44 | 1.44 | |
|   | 11.8 | 12.8 | | | 66 | | 1.29 |
|   | 15.7 | 19.0 | | | 84 | | 5.94 |
|   | 19.9 | 20.8 | | | 90 | | 11.6 |
| 1 | 8.30 | 4.6 | 0.210 | 44 | 15 | 2.76 | |
|   | 9.25 | 9.25 | .183 | | 32 | 1.73 | |
|   | 10.25 | 9.25 | .210 | | 44 | 0.63 | |
|   | 11.8 | 14.4 | .196 | | 66 | | 1.13 |
|   | 15.9 | 19.2 | .239 | | 84 | | 6.05 |
|   | 7.95 | 5.4 | 0.205 | 69 | 15 | 3.09 | |
|   | 8.95 | 9.75 | .182 | | 32 | 2.01 | |
|   | 9.95 | 11.05 | .182 | | 44 | 0.96 | |
|   | 12.1 | 13.8 | .196 | | 66 | | 1.48 |
|   | 16.25 | 20.3 | .219 | | 84 | | 6.5 |
| 2 | 8.75 | 10.2 | 0.165 | 19 | 15 | 2.19 | |
|   | 8.9 | 9.95 | .197 | | 32 | 2.0 | |
|   | 9.8 | 15.1 | .193 | | 44 | 1.03 | |
|   | 11.3 | 17.0 | .206 | | 66 | | 0.65 |
|   | 14.75 | 18.1 | .215 | | 84 | | 4.47 |
|   | 7.65 | 6.6 | 0.173 | 70 | 15 | 3.37 | |
|   | 8.40 | 6.9 | .214 | | 32 | 2.59 | |
|   | 9.5 | 11.5 | .203 | | 44 | 1.37 | |
|   | 11.9 | 15.0 | .211 | | 66 | | 1.32 |
|   | 16.4 | 19.5 | .280 | | 84 | | 6.43 |
|   | 7.0 | 4.6 | 0.207 | 97 | 15 | 4.02 | |
|   | 8.2 | 7.35 | .198 | | 32 | 2.76 | |
|   | 9.2 | 9.7 | .182 | | 44 | 1.52 | |
|   | 12.0 | 13.7 | .196 | | 66 | | 1.41 |
|   | 16.6 | 19.6 | .262 | | 84 | | 6.51 |
| 4 | 7.25 | 8.25 | 0.157 | 48 | 15 | 3.52 | |
|   | 8.2 | 12.45 | .171 | | 32 | 2.51 | |
|   | 9.5 | 16.3 | .163 | | 44 | 1.13 | |
|   | 11.0 | 14.1 | .186 | | 66 | | 0.54 |
|   | 17.8 | 16.7 | .252 | | 84 | | 8.90 |
|   | 6.9 | 7.5 | 0.173 | 75 | 15 | 3.86 | |
|   | 7.8 | 12.1 | .159 | | 32 | 2.9 | |
|   | 9.15 | 18.1 | .170 | | 44 | 1.48 | |
|   | 11.5 | 14.8 | .179 | | 66 | | 1.13 |
|   | 18.7 | 19.7 | .251 | | 84 | | 10.0 |
|   | 6.65 | 9.6 | 0.160 | 95 | 15 | 4.13 | |
|   | 7.75 | 14.2 | .169 | | 32 | 2.98 | |
|   | 9.55 | 18.5 | .175 | | 44 | 1.03 | |
|   | 11.9 | 18.4 | .195 | | 66 | | 1.62 |
|   | 19.5 | 22.0 | .277 | | 84 | | 11.2 |
| 5 | 8.85 | 15.1 | 0.181 | 18 | 15 | 1.48 | |
|   | 9.5 | 17.55 | .172 | | 32 | 0.99 | |
|   | 9.9 | 18.8 | .179 | | 44 | 0.43 | |
|   | 11.4 | 22.7 | .216 | | 66 | | 1.28 |
|   | 15.65 | 22.6 | .277 | | 84 | | 5.91 |
|   | 22.7 | 21.8 | .350 | | 90 | | 14.8 |
|   | 10.25 | 20.6 | .198 | | | | |
|   | 7.75 | 12.3 | 0.174 | 42 | 15 | 2.09 | |
|   | 8.25 | 16.8 | .182 | | 32 | 1.36 | |
|   | 9.05 | 18.3 | .182 | | 44 | 0.52 | |
|   | 11.4 | 21.0 | .203 | | 66 | | 2.14 |
|   | 17.8 | 22.7 | .273 | | 84 | | 10.1 |
|   | 26.1 | 22.8 | .482 | | 90 | | 21.8 |
|   | 10.25 | 20.0 | | | | | |
|   | 7.95 | 13.3 | 0.163 | 66 | 15 | 2.50 | |
|   | 8.9 | 17.95 | .176 | | 32 | 1.49 | |
|   | 9.7 | 17.95 | .191 | | 44 | 0.62 | |
|   | 12.7 | 24.2 | .199 | | 66 | | 2.80 |
|   | 20.4 | 23.2 | .306 | | 84 | | 12.8 |
|   | 28.6 | 26.5 | .515 | | 90 | | 25.7 |
| 6 | 8.35 | 12.3 | 0.163 | 44 | 15 | 2.94 | |
|   | 9.05 | 13.85 | .161 | | 32 | 2.22 | |
|   | 10.1 | 15.7 | .177 | | 44 | 1.07 | |
|   | 12.6 | 15.5 | .193 | | 66 | | 1.79 |
|   | 19.75 | 18.4 | .271 | | 84 | | 10.8 |
|   | 7.9 | 12.0 | 0.168 | 69 | 15 | 3.46 | |
|   | 8.8 | 14.6 | .176 | | 32 | 2.49 | |
|   | 10.1 | 14.1 | .169 | | 44 | 1.02 | |
|   | 12.95 | 17.2 | .185 | | 66 | | 2.17 |
|   | 21.2 | 19.9 | .320 | | 84 | | 12.8 |
| 6 | 10.0 | 13.8 | 0.163 | 94 | 44 | 1.14 | |
|   | 8.65 | 12.4 | .170 | | 32 | 2.66 | |
|   | 12.9 | 15.4 | .176 | | 66 | | 2.18 |

This table shows, for example, that if the dried half product containing, after drying, approximately 10.77% moisture and 4% NaCl is stored in a moisture conditioning room at 20° C. for 48 hours in a relative humidity of 15%, its moisture content will be reduced to 7.25% and on frying in hot fat at about 190° to 195° C. it will produce a crispy expanded food product having only 8.25% fat and a density of 0.157, equal to substantially a seven fold expansion of the dried half product.

This table also shows in a similar manner how various percentages of fat content with various degrees of expansion or weight-to-volume ratio can be produced.

While I have set forth certain theories of operation and given specific examples of the practice of my invention, it will be understood that these are for the purpose of explanation and illustration and that I do not intend to be limited by any of the theories expressed or the examples set forth. Other starch containing flours, such as those derived from tapioca, rice, corn, and the like may be used. Various modifications and changes may be made from the embodiments described herein, without departing from the spirit of my invention or the scope of the following claims.

I claim:

1. The method of producing a crispy expanded formed foodstuff from starch containing flour comprising mixing potato starch flour, having about 30% free starch content with water so that the water content is between about 25% and 40%, extruding the so-produced mixture under a pressure of at least 6 atmospheres to form coherent bands, drying the bands in a controlled relative humidity of between 15% and 45% to a water content of less than 20% on the interior thereof and less than 10% at the surface, breaking the dried band into piecelets, and while maintaining the water content at less than 20% on the interior and less than 10% at the surface, frying the piecelets in hot oil to produce a crispy expanded foodstuff having a weight-to-volume ratio of below 0.20 and a fat content of less than 20%.

2. The method of producing a crispy expanded formed foodstuff from starch containing flour comprising mixing an edible starch containing flour, having about 30% free starch content with water so that the water content is between about 25% and 40%, extruding the so-produced mixture under a pressure of at least 6 atmospheres to form coherent bands, drying the bands in a controlled relative humidity of between 15% and 45% to a water content between 7% and 20% to produce a horny outer layer having a water content not higher than 85% of the overall average moisture content of the dried band with the center having a higher percentage moisture content than the overall average moisture content which is below 20% and while maintaining the said relative water content frying the piecelets in hot oil to produce a crispy expanded foodstuff having a weight-to-volume ratio of below 0.20 and a fat content of less than 20%.

3. The method of producing a crispy expanded formed foodstuff from starch containing flour comprising mixing an edible starch containing flour having about 30% free starch content with water so that the water content is between about 28 and 35%, extruding the so-produced mixture under a pressure of at least 6 atmospheres to form coherent bands, drying the bands in a controlled relative humidity of between 15% and 45% so that the moisture content of the center portion is between about 12 to about 20% and the moisture content of the outer one-fourth of the bands is about 5 to about 10%, breaking the dried bands into piecelets and while maintaining the moisture content at between about 12 and about 20% in the center portion and between about 5% and about 10% in the outer one-fourth portion of the broken bands, frying the piecelets in hot oil to produce a crispy expanded foodstuff having a weight-to-volume ratio of below 0.20 and a fat content of less than 20%.

4. The method of producing a crispy expanded formed foodstuff from starch containing flour comprising mixing potato flour having about 30% free starch content with water so that the water content is between about 28 and 35%, extruding the so-produced mixture under a pressure of at least 6 atmospheres to form coherent bands, drying the bands in a controlled relative humidity of between 15% and 45% so that the moisture content of the center portion is between about 12 to about 20% and the moisture content of the outer one-fourth of the bands is about 5 to 10%, breaking the dried bands into piecelets and while maintaining the moisture content at between about 12 and about 20% in the center portion and between about 5% and about 10% in the outer one-fourth portion of the broken bands, frying the piecelets in hot oil to produce a crispy expanded foodstuff having a weight-to-volume ratio of about 0.18 and a fat content of less than 16%.

5. The method of producing a crispy expanded formed foodstuff from starch containing flour comprising mixing potato flour having about 30% free starch content with water so that the water content is between about 28 and 35%, extruding the so-produced mixture under a pressure of at least 6 atmospheres to form coherent bands, drying the bands in a controlled relative humidity of between 15% and 45% so that the moisture content of the center portion is about 17% and the moisture content of the outer one-fourth of the bands is about 7%, breaking the dried bands into piecelets and while maintaining the moisture content at about 17% in the center portion and about 7% in the outer one-fourth portion of the broken bands, frying the piecelets in hot oil to produce a crispy expanded foodstuff having a weight-to-volume ratio of about 0.18 and a fat content of less than 16%.

6. The method of producing a crispy expanded formed foodstuff from starch containing flour comprising mixing an edible starch containing flour having about 30% free starch content with water so that the water content is between about 25% and 40%, extruding the so-produced mixture under a pressure of at least 6 atmospheres to form coherent bands, drying the bands in the atmosphere, storing the dried bands before frying in a moisture conditioning room having a controlled relative humidity of between 15% and 45% to reduce their moisture content to between 7% and 10%, separating the bands into pieces and frying the said pieces in hot oil.

7. The method of producing a crispy expanded formed foodstuff from starch containing flour comprising mixing an edible starch containing flour having about 30% free starch content with water so that the water content is between about 25% and 40%, extruding the so-produced mixture under a pressure of at least 6 atmospheres to form coherent bands, drying the bands in the atmosphere, storing the dried bands before frying in a moisture conditioning room having a controlled relative humidity of between 15% and 45% to reduce their moisture content to between 7% and 10%, separating the bands into pieces and frying the said pieces in hot oil to produce a crispy expanded foodstuff having a weight-to-volume ratio of below 0.20 and a fat content of less than 20%.

8. The method of producing a formed foodstuff intermediate from starch containing flour comprising mixing an edible starch containing flour having about 30% free starch content with water so that the water content is between about 25% and 40%, extruding the so-produced mixture under a pressure of at least 6 atmospheres to form coherent bands, drying the bands in a controlled relative humidity of between 15% and 45% to a water content of less than 20% on the interior thereof and less than 10% at the surface, breaking the dried bands into piecelets, and adjusting the water content of the piecelets to less than 20% on the interior and less than 10% on the surface prior to frying.

9. The method of controlling the fat content of a crispy expanded formed foodstuff of the type described, which comprises maintaining until frying dried extruded starch containing strands in a controlled relative humidity of between 15% and 45% to reduce the total overall moisture content to between 7% and 10% with the moisture in the outer layers being not more than 85% of the total overall moisture content of the bands and frying them in hot oil to produce a crispy expanded foodstuff having a fat content of below about 16%.

References Cited in the file of this patent

UNITED STATES PATENTS

| | | |
|---|---|---|
| 2,438,939 | Ozai-Durrani | Apr. 6, 1948 |
| 2,863,770 | Spieser | Dec. 9, 1958 |

OTHER REFERENCES

"Cereal Chemistry," vol. X, No. 5, September 1933, article entitled Macaroni Products by Le Clerc, pages 407 to 409, inclusive.

"Industrial and Engineering Chemistry," vol. 33, No. 5, May 1941, article entitled Drying Macaroni by Earle et al., pages 642 to 647, inclusive.